(No Model.) 4 Sheets—Sheet 2.

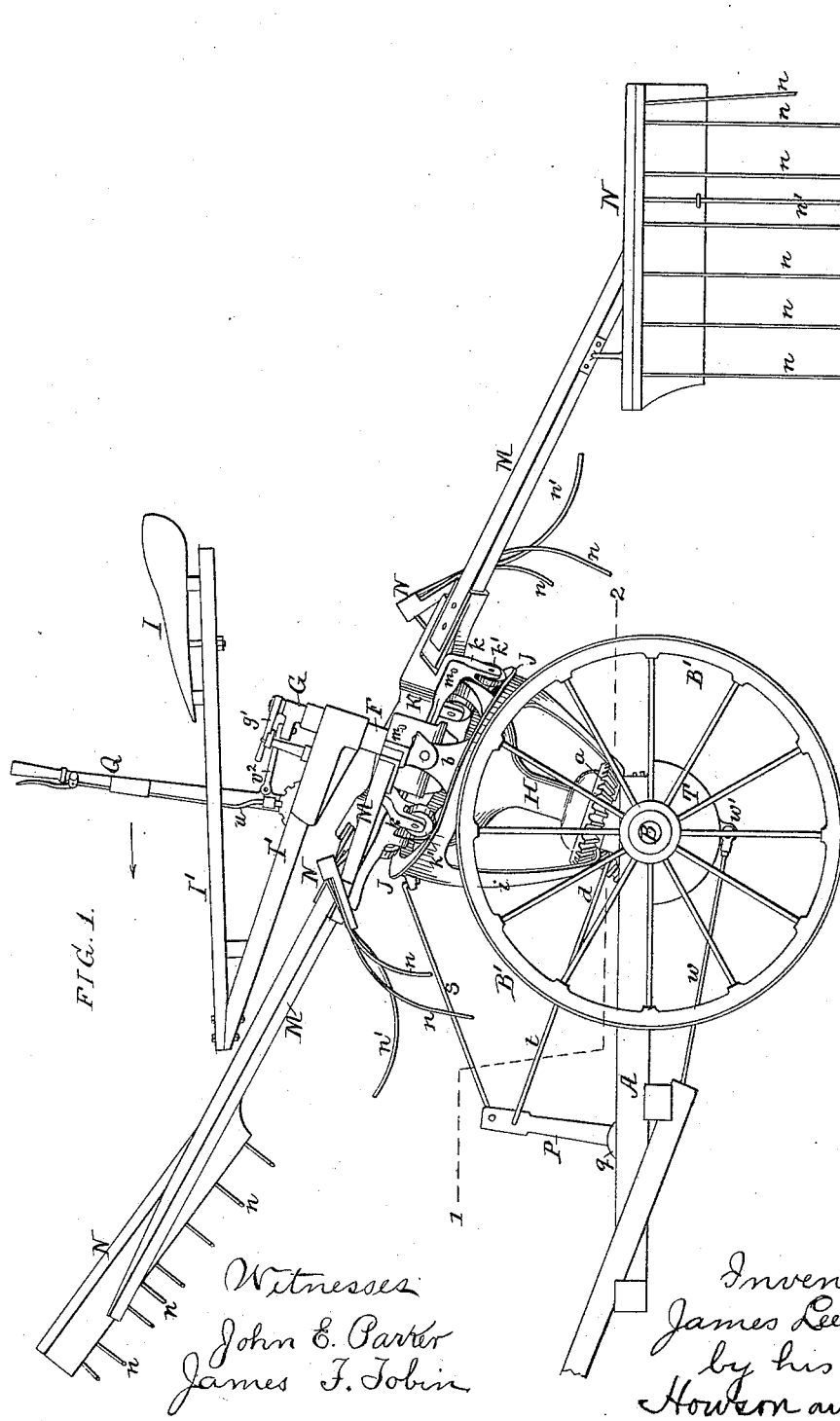

J. LEE, Jr.
COMBINED RAKE AND TEDDER.

No. 319,274. Patented June 2, 1885.

Witnesses—
John E. Parker
James F. Tobin

Inventor
James Lee Jr
by his Attys
Howson and Sons (No Model.) 4 Sheets—Sheet 3.

J. LEE, Jr.
COMBINED RAKE AND TEDDER.

No. 319,274. Patented June 2, 1885.

Witnesses
John E. Parker
James F. Tobin

Inventor
James Lee Jr
by his Attys
Howson and Sons

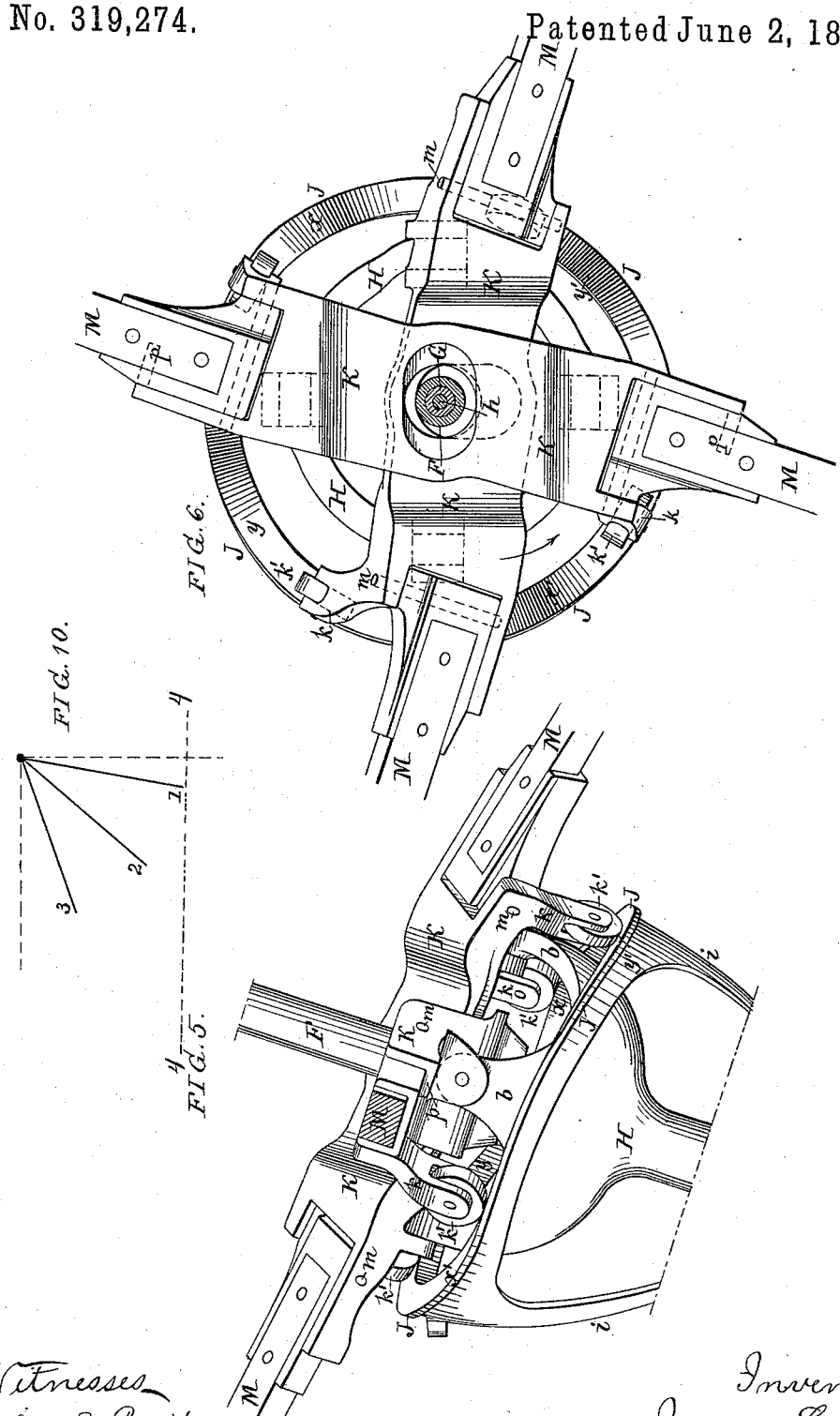

UNITED STATES PATENT OFFICE.

JAMES LEE, JR., OF STONERSVILLE, ASSIGNOR OF ONE-HALF TO CHRISTIAN STOLZ, OF READING, PENNSYLVANIA.

COMBINED RAKE AND TEDDER.

SPECIFICATION forming part of Letters Patent No. 319,274, dated June 2, 1885.

Application filed March 3, 1884. (No model.)

*To all whom it may concern:*

Be it known that I, JAMES LEE, Jr., a citizen of the United States, and a resident of Stonersville, Berks county, Pennsylvania, have invented certain Improvements in Hay Rakes and Tedders, of which the following is a specification.

The object of my invention is to construct a machine for rapidly raking and turning hay in the field, the construction of the machine being such that the hay can be either turned over or turned and raked into wide or close windrows. This object I attain in the manner hereinafter set forth, reference being had to the accompanying drawings, in which—

Figure 7:
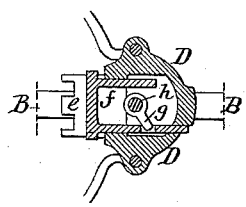
Figure 3:
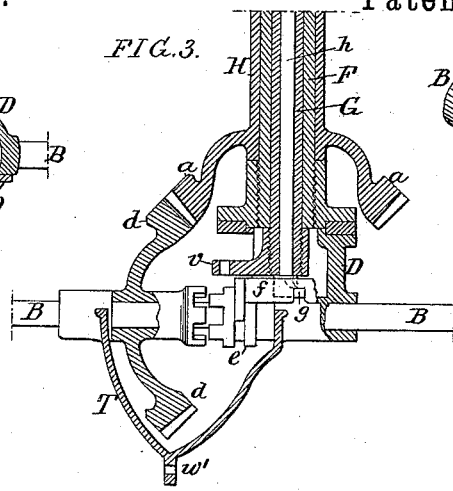
Figure 8:
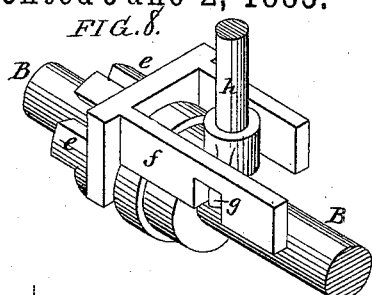
Figure 2:
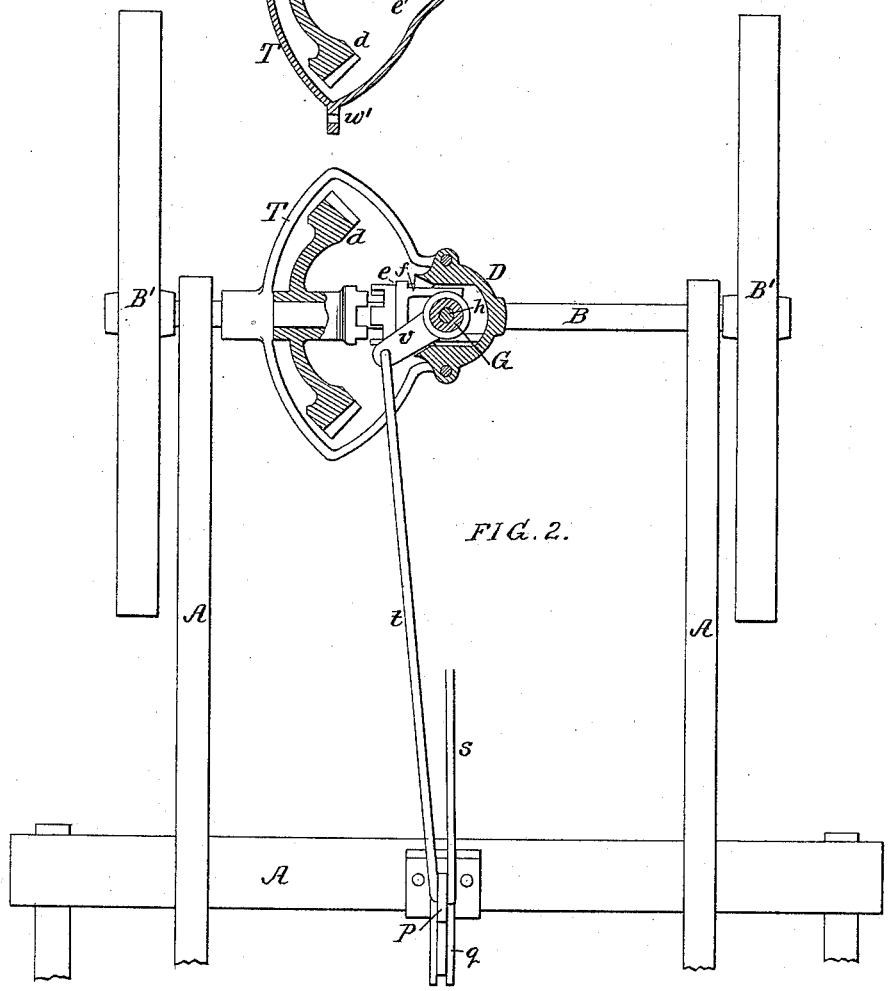
Figure 4:
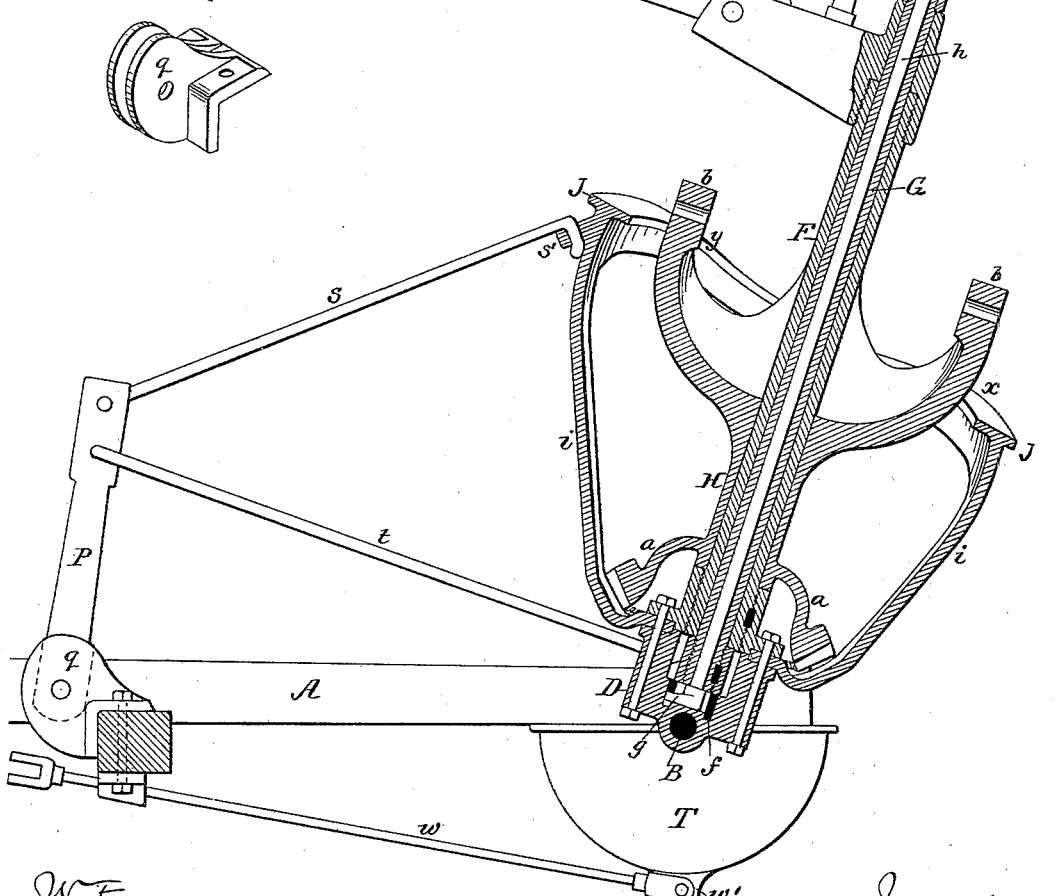
Figure 9:
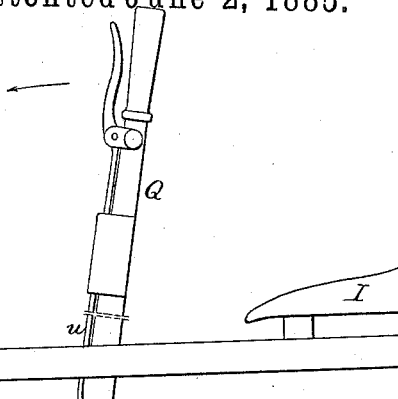

Figure 1 is a side view of my improved hay rake and tedder; Fig. 2, a sectional plan, on a larger scale, on the line 1 2, Fig. 1; Fig. 3, a longitudinal section of part of Fig. 1 on the same scale as Fig. 2; Fig. 4, a vertical section of part of Fig. 1 on a still larger scale; Fig. 5, a side view of part of the rake-arms, their carriers, and the supporting cam-track; Fig. 6, a plan view of the same; Figs. 7, 8, and 9, detached views of different parts of the machine, and Fig. 10 a view showing the various angular elevations of the rake-teeth.

A is the frame of the machine, to suitable bearings in which is fitted an axle, B, which is free to turn in these bearings, and has at each end a wheel, B', there being a suitable ratchet-connection between the axle and these wheels, such as is common in mowing-machines, &c., so that the wheels impart only forward movement to the axle, the machine being backed or turned without risk of deranging the rake-operating mechanism.

To the axle B is hung a frame, D, from which projects upward a tubular standard, F, having within it a hollow shaft, G, and around it a sleeve, H, free to turn thereon, this sleeve having at the lower end a bevel-wheel, $a$, and at the upper end a series of projections, $b$. The bevel-wheel $a$ gears into a pinion, $d$, the hub of which is loose on the axle, and engages with a clutch, $e$, said clutch being splined or otherwise secured to the axle and thrown in or out of gear by means of a slide, $f$, Figs. 3, 7, and 8, guided in the frame D, and actuated by an arm, $g$, at the lower end of a spindle, $h$, which passes through the hollow shaft G, and has at the upper end an arm, $g'$, within reach of the driver, who occupies the seat I on the frame I', the latter projecting from the upper end of the tubular standard F.

Secured to and projecting upward from the frame D are two arms, $i$ $i$, which carry at their upper ends a cam-track, J, of the character described hereinafter.

Pivoted to the ears $b$ of the sleeve H, which ears are arranged at equal distances apart, are two rocking frames, K, each of which has at its extremities arms $k$ $k$, projecting downward and carrying rollers $k'$, which bear upon the cam-track J.

Hung to the outer ends of the frames K by transverse pivot-pins $m$ are the rake-arms M, to the outer ends of which are secured the rake-heads N, which are furnished with elastic teeth $n$, as usual. Each rake has in addition to the teeth $n$ a reversed tooth, $n'$, this tooth bearing upon the ground, and serving as a guard to prevent the points of the teeth $n$ from coming forcibly into contact with the ground as the rake is moved over the same. As the frame A is drawn forward, the axle B rotates, and, through the medium of the gearing $a$ $d$, turns the sleeve H, and thus causes a rotation of the frames K and the rake-arms and rakes carried thereby. The cam-track J and sleeve H are so inclined that the rake-arms will travel in a plane at an oblique angle in respect to the surface of the ground, the rakes being caused to sweep laterally across the path of the machine at the rear while they are at the limit of their downward movement, and being elevated as they are carried forward, so as to pass over the shafts when making their lateral sweep at the front of the machine, being then at their highest point, and gradually descending into operative position as they are again carried to the rear. The rakes have a tilting movement to permit the discharge of the hay, and to enable them to assume a nearly horizontal position while being carried across the shafts, thus rendering it unnecessary to elevate the outer ends of the rake-arms as much as would otherwise be necessary.

The diagram Fig. 10 illustrates the different positions assumed by the rake, this diagram being supposed to be an end view of the rake, and the surface of the ground being indicated by the line 4 4. The line 1 indicates the position of the rake while it is being carried across the rear of the machine. When the rake has reached the limit of its lateral movement and is about to ascend, it is tilted to the position indicated by the line 2, and before reaching the limit of its forward movement it is further tilted to the position indicated by the line 3, which position it occupies as it swings over the horses, the rake as it is carried rearward being restored, first, to the position 2, and then to the position 1, which latter position it occupies when it again commences to act upon the hay.

The tilting of the rakes, as described, is effected by the peculiar conformation of the cam-track J. On reference to Figs. 4, 5, and 6, it will be seen that the track has on one half two elevations, $x$ and $y$, and on the opposite half corresponding depressions, $x'$ $y'$. As each frame K is carried round in the direction of the arrow, the roller $k'$ at one end of the frame ascends the rise $x$, and the roller $k'$ at the opposite end of the frame descends the depression $x'$, thus tilting the frame and changing the rear rake from the position 1 to the position 2, and the forward rake from the position 3 to the position 2. The rotary movement continuing, the roller $k'$ ascends the rise $y$, and the opposite roller descends the depression $y'$, thus further tilting the frame, and moving the upper rake from the position 2 to the position 3, and the lower rake from the position 2 to the position 1.

Owing to the pivotal connection between the rake-arms M and the frames K, said rake-arms are free to rise at the outer ends, so that the rakes can accommodate themselves to inequalities in the ground, stops $p$ on the frames K, however, limiting the descent of the arms, and insuring the proper elevation of the same by the frames, as above set forth. These stops are shown in Fig. 5, and by dotted lines in Fig. 6.

To tilt the entire rake carrying and operating mechanism in order to lift the rakes from the ground to any desired extent, I use a device shown in Figs. 2 and 4, on reference to which it will be observed that an arm, P, is hung to a bracket, $q$, on the frame A, the upper end of this arm being connected by a rod, $s$, to an eye, $s'$, on the cam-track J, and another rod, $t$, extending from the arm at a point nearer the pivot to an arm, $v$, on the lower end of the hollow shaft G, an arm, $v'$, at the upper end of the latter being connected by a rod, $v^2$, to an operating-lever, Q, which is furnished with a locking-bolt, $u$, adapted to a notched quadrant, $u'$, so that the lever can be retained in any position to which it is adjusted. By moving the arm in the direction of the arrow, a partial turning of the shaft G is caused, and a forward thrust is imparted to the arm P, so as to exert a lifting effect on the cam-track, the frame D, and the parts carried thereby. By this means the action of the rakes can be so governed that the hay may be simply turned and allowed to lie over the entire field, or it may be raked up into windrows, either wide or close. Thus, if the machine is driven continuously around the field, it will turn and rake the hay into rows, the distance between which will be equal to the lateral sweep of the rakes, while if the machine is driven back and forth across the field the windrows will be twice as far apart, all the hay acted on by the machine in moving across the field and back being raked into one row.

In order to overcome any tendency which the rotating pinion $d$ may have to tip the rake-carrying frame forward, I connect a rod, $w$, to an eye, $w'$, at the bottom of the casing T, which incloses the gearing and forms part of the frame D, the front end of this rod being shaped to connect to the single-tree, so that the draft of the team is exerted to hold the frame D in the position shown in the drawings.

The frames K form in effect a rotating head carrying the rake-arms, so that the collection of the hay is effected by a lateral sweeping of the rake across the path of the machine, instead of by a rake following longitudinally in said path, as in ordinary hay-rakes.

Harvesters have been devised in which the rake-head has been hung by universal joints to the upper end of the operating-shaft, and the rake-arms have been acted upon by an inclined cam-track; but in such machines the shaft carrying the rake-head has not been inclined; hence the cam has, of necessity, been at a very abrupt angle, in order to impart the necessary lift to the rake-arms, and the rotation of the rake-head consequently demanded the exercise of considerable power.

The same objection applies to that class of harvesters in which the rake-arms are pivoted to a head secured to the upper end of a vertical driving-shaft, the arms being acted upon by a cam-track in order to lift the same. This objection is overcome by inclining the shaft which drives the rake-head, as in my machine, for in this case the function of the cams is to effect the lateral tilting of the frames constituting the rake-heads. This lateral tilting also effects a slight rise or fall of the rakes and rake-arms, for on reference to Fig. 6 it will be observed that said rake-arms are not exactly in line with the tilting axes of the frames K, so that when one of said frames is tilted one of the arms, M, will be lifted slightly and the other arm correspondingly lowered, this movement being independent of that due to the inclined plane in which the rake-arms rotate.

My improved hay-rake differs from the ordinary harvester in another important respect—namely, in raking laterally at the rear of the machine, instead of longitudinally at the side of the machine, as in a harvester. The rakes must be in the highest position when they pass over the front of the machine; hence, when they commence to rake well forward at one side of the machine, there must be a sudden descent from the elevated to the working position. In my machine, on the contrary, all of the raking is done directly across the rear of the machine, and the rakes have a gradual rise on one side of the machine in passing from rear to front, and a gradual descent on the other side in passing from front to rear.

Without claiming broadly, therefore, a raking device in which the rake-arms rotate in an oblique course, or in which a rotating rake-head and its arms are combined with an inclined cam-track, I claim as my invention and desire to secure by Letters Patent—

1. A hay-rake in which a wheeled frame is combined with a rake-head carrying the rake-arms and inclined from front to rear, and with mechanism for rotating said rake-head, as set forth.

2. The combination of the wheeled frame, the rake-head mounted thereon and carrying the rake-arms, mechanism for rotating said rake-head, and an inclined supporting-track for the head, said track being highest at the front end and lowest at the rear, as set forth.

3. The combination of the wheeled frame, the rake-head, its arms, and the rakes carried thereby, the inclined supporting-track, the rearwardly-inclined sleeve H, for driving the rake-head, and gearing whereby said sleeve is rotated, as set forth.

4. The combination of the wheeled frame, the driving-sleeve mounted thereon, a rake-head consisting of frames K, each carrying rake-arms, and each hung to said driving-sleeve so as to be free to tilt laterally, and a cam-track serving as a support for said frames, and as a means for laterally tilting the same, as set forth.

5. The combination of the wheeled frame, the standard F, the sleeve H, having a bearing thereon, means for rotating said sleeve, a frame, K, pivoted to the sleeve and having at each end a projecting rake-carrying arm, M, and a cam-track, J, adapted to act upon and cause the lateral tilting of the frame K as the same is rotated, as set forth.

6. The combination of the wheeled frame with a rotating rake-head consisting of rocking frames, each having arms M pivoted thereto, so as to be free to swing upward at the outer ends, as set forth.

7. The combination of the wheeled frame, the rake-head comprising rocking frames K, having stops $p$, rake-carrying arms M, pivoted to the frames K, and mechanism for rotating said frames, as set forth.

8. The combination of the rake having teeth $n$ with a reversed tooth, $n'$, serving as a guard, as set forth.

9. The combination of the wheeled frame A of the machine, a rotating rake-head, and a frame, D, carrying said head and hung to the axle of the machine, whereby the angle of the head may be changed by an adjustment of the said frame D, as set forth.

10. The combination of the wheeled frame A of the machine, a rotating rake-head, and a frame, D, hung to the axle of the machine, carrying said head and its rotating devices, and provided with a seat-frame, I', as set forth.

11. The combination of the wheeled frame A of the machine, a frame, D, hung to the axle and having a standard, F, with seat-frame I', rake supporting and operating devices carried by the frame D, an arm, P, hung to the frame A, a shaft, G, adapted to the standard F, and rods $s\ t$, whereby the arm P is connected to the frame D and to an arm on the shaft G, as set forth.

12. The combination of the frame A, the frame D, hung to the axle, the rake-carrying head having a bearing on said frame, gearing for rotating the head from the axle, and a draft-rod, $w$, connected to the frame D, as set forth.

In testimony whereof I have signed my name to this specification in the presence of two subscribing witnesses.

JAMES LEE, JR.

Witnesses:
 J. N. METZGER,
 WM. A. H. SCHMEHL.